US010569816B2

(12) United States Patent
Casters

(10) Patent No.: US 10,569,816 B2
(45) Date of Patent: Feb. 25, 2020

(54) TRACK CHAIN MECHANISM

(71) Applicant: CONSULTING CASTERS FRANÇOIS BVBA, Opglabeek (BE)

(72) Inventor: Francois Casters, Opglabeek (BE)

(73) Assignee: Consulting Casters François BVBA, Opglabeek (BE)

(*) Notice: Subject to any disclaimer, the term of this patent is extended or adjusted under 35 U.S.C. 154(b) by 0 days.

(21) Appl. No.: 16/066,717

(22) PCT Filed: Dec. 30, 2016

(86) PCT No.: PCT/EP2016/082932
§ 371 (c)(1),
(2) Date: Jun. 28, 2018

(87) PCT Pub. No.: WO2017/114954
PCT Pub. Date: Jul. 6, 2017

(65) Prior Publication Data
US 2019/0009846 A1    Jan. 10, 2019

(30) Foreign Application Priority Data
Dec. 31, 2015  (EP) ..................... 15203267

(51) Int. Cl.
*B62D 55/116*  (2006.01)
*B62D 55/06*  (2006.01)
(Continued)

(52) U.S. Cl.
CPC ............ *B62D 55/116* (2013.01); *B60G 11/58* (2013.01); *B62D 55/06* (2013.01); *B62D 55/10* (2013.01); *B60G 2300/32* (2013.01)

(58) Field of Classification Search
CPC ...... B62D 55/116; B62D 55/06; B62D 55/10; B60G 11/58
(Continued)

(56) References Cited

U.S. PATENT DOCUMENTS 1,344,363 A * 6/1920 Turnbull ............ B62D 55/0842
180/9.54
1,885,486 A * 11/1932 Smyth .................. B62D 55/104
180/9.54
(Continued)

FOREIGN PATENT DOCUMENTS

DE        591113       1/1934
DE        593618       3/1934
EP        2527235 A1   11/2012

OTHER PUBLICATIONS

International Search Report and Written Opinion for PCT/EP2016/082932 Filed Dec. 30, 2016. pp. 1-12.
(Continued)

*Primary Examiner* — Joseph M Rocca
*Assistant Examiner* — Conan D Duda
(74) *Attorney, Agent, or Firm* — Dinsmore & Shohl LLP

(57) ABSTRACT

The present invention relates to crawler vehicles and more particular to track chain suspension mechanisms, which provide for a smooth and levelled operation of the vehicle. The track chain suspension mechanism of the present invention is characterized in having a first and a second track frame, the first frame being suspended to the vehicle by means of a suspension shaft pivotally and slidable mounted to a suspension frame, the second track frame pivotally connected to the vehicle by means of a drive shaft mounted to a drive frame and wherein said first and second track frame pivotally connected to one another by means of a pivot shaft. In its application for concrete path laying machines the track chain suspension mechanism is further characterized in comprising only one idler at the front of the first track frame.

15 Claims, 5 Drawing Sheets

(51) Int. Cl.
*B62D 55/10* (2006.01)
*B60G 11/58* (2006.01)

(58) Field of Classification Search
USPC ...................................................... 180/9.54
See application file for complete search history.

(56) References Cited

U.S. PATENT DOCUMENTS

| | | | | |
|---|---|---|---|---|
| 2,823,044 | A * | 2/1958 | Bouffort | B62D 55/10 |
| | | | | 180/9.5 |
| 3,417,832 | A * | 12/1968 | Ziccardi | B62D 55/04 |
| | | | | 180/9.3 |
| 3,446,303 | A * | 5/1969 | Trapp | B62D 55/116 |
| | | | | 180/9.5 |
| 3,447,620 | A * | 6/1969 | Schoonover | B62D 55/08 |
| | | | | 180/9.52 |
| 3,447,621 | A * | 6/1969 | Schoonover | B62D 55/07 |
| | | | | 180/9.52 |
| 3,841,424 | A | 10/1974 | Purcell et al. | |
| 4,709,773 | A * | 12/1987 | Clement | B62D 55/065 |
| | | | | 180/9.32 |
| 4,772,076 | A * | 9/1988 | Seeber | B60G 17/033 |
| | | | | 305/131 |
| 5,076,378 | A | 12/1991 | Lagace | |
| 5,515,936 | A | 5/1996 | Lagace | |
| 5,622,234 | A * | 4/1997 | Nagorcka | B62D 55/08 |
| | | | | 180/9.5 |
| 6,408,964 | B1 * | 6/2002 | Roh | B62D 55/02 |
| | | | | 180/9.34 |
| 2002/0017403 | A1 | 2/2002 | Phely | |
| 2008/0211299 | A1 * | 9/2008 | Wilt | B62D 55/065 |
| | | | | 305/131 |
| 2012/0183383 | A1 * | 7/2012 | Stolkin | B62D 55/075 |
| | | | | 414/729 |

OTHER PUBLICATIONS

International Preliminary Report on Patentability for PCT/EP2016/082932 Filed Dec. 30, 2016. pp. 1-7.

* cited by examiner

TRACK CHAIN MECHANISM

FIELD OF THE INVENTION

The present invention relates to crawler vehicles and more particular to track chain suspension mechanisms, which provide for a smooth and levelled operation of the vehicle. The track chain suspension mechanisms is of particular use to machines for laying concrete paths of the type in which a concrete mix in the plastic state is spread over a certain width and levelled by means of a levelling element suspended behind the machine. The track chain suspension mechanism of the present invention is characterized in having a first and a second track frame, the first frame being suspended to the vehicle by means of a suspension shaft pivotally and slidable mounted to a suspension frame, the second track frame pivotally connected to the vehicle by means of a drive shaft mounted to a drive frame and wherein said first and second track frame pivotally connected to one another by means of a pivot shaft. In its application for concrete path laying machines the track chain suspension mechanism is further characterized in comprising only one idler at the front of the first track frame. In this application it is also beneficial to have the drive shaft mounted as low as possible to the ground. Thus in a further embodiment of the present invention the drive shaft is mounted below the rotation axis of the Idlers when the track chain suspension mechanism is in level position.

BACKGROUND TO THE INVENTION

This invention relates to crawler vehicles and more particularly to track chain suspensions therefor.

The track chain of most commercial crawler vehicles is usually engaged on a pair of large longitudinally spaced wheels wherein the forward wheel is an idler and the rear wheel is toothed and constitutes the drive sprocket for the chain; smaller roller wheels being distributed between the two major wheels for support and load bearing purposes. A disadvantage of such a configuration is the long track frame carrying the wheels. Such a long frame enhances vertical displacements of the track chain suspension mechanisms when driving on rough terrain. For use on concrete laying machines it is however important that shock and drive load forces on the vehicle are maximally reduced and/or prevented. Present solutions to provide for the absorption of shocks and to provide for maintenance of track chain tension and vehicle stability consist of triangular track chain suspensions such as for example described in U.S. Pat. No. 3,841,424. In such triangular track chain suspensions the drive train is moved upward and above the track frame carrying the idlers and track rollers. Shortening the base with an eventual pivotal connection, results in a resilient drive train having recoiling ability with an increased absorption of shocks and efficient driving action on rough terrain.

Where suitable for certain crawling devices, such triangular track chain suspension mechanisms are not suitable for machines that have to pull heavy loads such as machines for laying concrete paths of the type in which a concrete mix in the plastic state is spread over a certain width and levelled by means of a levelling element suspended behind the machine. In such machines very high leverage forces are acting on the drive shaft of the track chain suspension mechanisms. With a triangular configuration the elevated drive shaft lengthens the load arm and front lifting of the vehicle can hardly be prevented, in particular when driving over rough terrain where vertical displacements of the track frame due to relief elements add to the leverage forces acting on the drive shaft when pulling heavy loads.

It is an objective to address the foregoing problems and to provide track chain suspension mechanisms, which provide for a smooth and levelled operation of the vehicle, in particular for machines that have to pull heavy loads such as machines for laying concrete paths of the type in which a concrete mix in the plastic state is spread over a certain width and levelled by means of a levelling element suspended behind the machine.

SUMMARY OF THE INVENTION

It is an object of the present invention to provide a vehicle (1) having a suspension frame (2), a drive frame (3) and a track chain suspension mechanism (4) characterized in that the track chain suspension mechanism has a first (5) and a second (6) track frame, the first frame being suspended to the vehicle by means of a suspension shaft (7) pivotally and slidable mounted to the suspension frame, the second track frame pivotally connected to the vehicle by means of a drive shaft (8) mounted to the drive frame and wherein said first and second track frame are pivotally connected to one another by means of a pivot shaft (9).

The track chain suspension mechanism is present on either side of the vehicle. As such the vehicle has four suspension points which taken together with the aforementioned characteristics of the track suspension mechanism allow to control the levelling position of the vehicle under all circumstances. With a traditional single frame, track chain suspension mechanism the hydraulic electronic control on the suspension is not fast enough to cope with large horizontal displacements of the track chain suspension mechanism. Knowing that the tolerance in concrete laying machines is only 4 mm over a length of 3 m, such traditional single frame track chain mechanisms are no option when a levelled operation of the vehicle is a requisite, such as for example in machines for laying concrete paths of the type in which a concrete mix in the plastic state is spread over a certain width and levelled by means of a levelling element suspended behind the machine.

The track chain suspension mechanism as used herein could be based on any conventional track chain (14). As such it will typically comprise an idler (10), track rollers (11), a drive sprocket (12) and a recoil mechanism (13) to maintain the track at the proper operating tension. Thus in a further aspect the vehicle according to the invention has a track chain mechanism, wherein the track chain suspension mechanism further encompasses an idler, track rollers, a drive sprocket and a recoil mechanism.

As will be further detailed below, splitting the conventional track frame in two parts, pivotally connected to one another and wherein one of the two track frames is in itself slidable and pivotally mounted to the vehicle frame, gives flexibility to the track chain suspension mechanism and allows a better absorption of uneven terrain. As such, the track chain will have to accommodate greater length adjustments. Under such circumstances one would expect the need of a plurality of idlers and accompanying recoil mechanisms to assure maintenance of the track chain at the proper tension. Surprisingly, the aforementioned split arrangement allows the presence of a single idler and recoil mechanism. More in particular at the front of the first track frame. That indeed a single idler with recoil mechanism are sufficient to maintain the track chain at the proper suspension follows from the fact that in either position of the track suspension mechanism passing an obstacle (See also FIG. 2), the track chain extends on one side and shortens on the other side. Thus in an embodiment the track chain suspension mechanism of the vehicle according to the invention has only one idler at the front of the first track frame. In the exemplified embodiment the recoil mechanism consists of a hydropneumatic cylinder (15) and a spring (16), but evidently should not be understood as limiting the invention to this particular embodiment. Alternative recoil mechanisms could for example consist of hydropneumatic cylinders, compression pads, or combinations thereof. To accommodate the longitudinal displacement of the idler, this is rotatable mounted on bearings (17) that slidable fit in the track frame(s); in particular in the first track frame For the reasons detailed above, it is advantageous, and in particular when used on a vehicle pulling heavy loads, to have the drive shaft as close as possible to the point of engagement of the pulling force. When used in machine for laying concrete paths the drive shaft should be as close as possible to the ground. For said reason, in a particular embodiment, the vehicle of the instant application has the drive shaft mounted below the rotation axis (22) of the idlers when the track chain suspension mechanism is in level position. As explained the low position of the drive shaft shortens the leverage and reduces lift forces on the vehicle, thus contributing to a steady and levelled operation of the vehicle. With the main leverage forces acting on the drive shaft, it is beneficial to give the drive shaft maximal support. Thus in a particular embodiment the density of track rollers is higher underneath the drive shaft. See FIG. 1, showing three track rollers (11a-c) immediately adjacent to one another underneath the drive shaft (8) where said track rollers are spaced from one another over the rest of the track chain.

As will be further detailed below, whilst moving over an obstacle the two rotation points, i.e. the pivotally suspension of the first track frame and the pivotally connection between the first and second track frame, gives the track mechanism flexibility and a less disturbing operation when it comes to the levelling of the vehicle. However, the mere longitudinal displacement of the idler with respect to the track frame when exposed to an obstacle and the two foregoing rotation points were found insufficient to accommodate the working loads on the track chain. For said reason the first track frame is not only pivotally mounted to the suspension frame but also slidable mounted thereto. The suspension frame accordingly requires means to allow for a longitudinal displacement of the suspension shaft, such as for example an opening (18); in particular a rectangular opening, to accommodate the suspension shaft. When used in a machine for lying concrete paths, the suspension shaft has flanges (19) preventing lateral displacement of the latter.

The need for a slidable configuration is not there for the second rotation point in the track chain suspension mechanism of the instant invention. In its simplest form this rotation point, i.e. the pivot shaft (9) between the first and second track frame has a shaft bearing (20) and a support arm (21). The shaft bearing present on one of the track frame and the support arm on the other track frame. In the exemplified embodiment the shaft bearing is mounted to the first track frame and the support arm is mounted to the second track frame.

Per reference to the exemplified embodiments, the first frame (5) is about halfway suspended to the vehicle. Any position within the second half of the first track frame, i.e. proximal to the pivot shaft is suitable. The second track frame (6) is connected near its rear end to the drive frame, and in these exemplified embodiments the first and the second track frame have approximately the same length. Presence of the drive shaft at the second track frame also implies that the drive sprocket (12) is present at the second track frame; more in particular at the rear end of the second track frame.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

Figure 1:
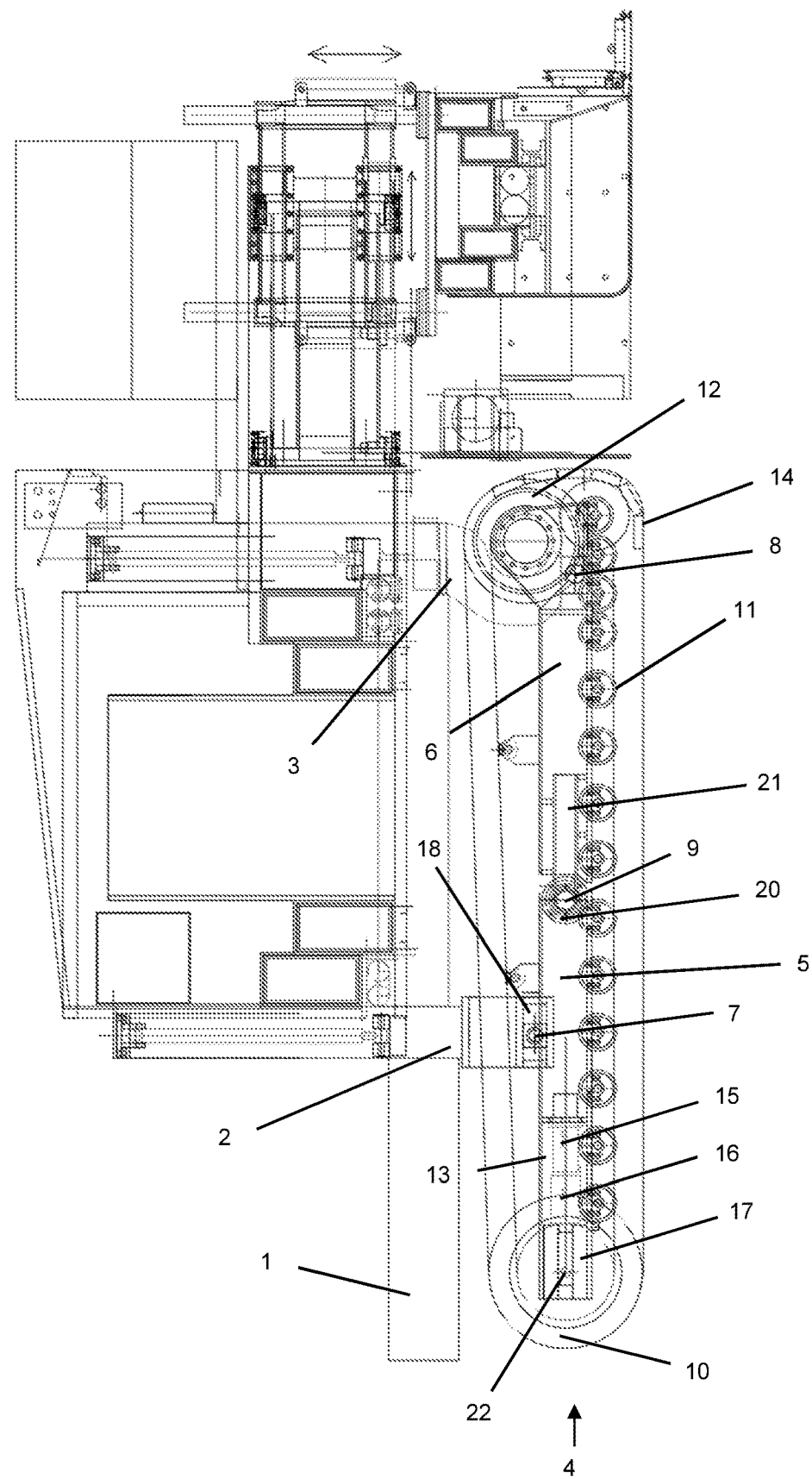
FIG. 1.
Figure 2:
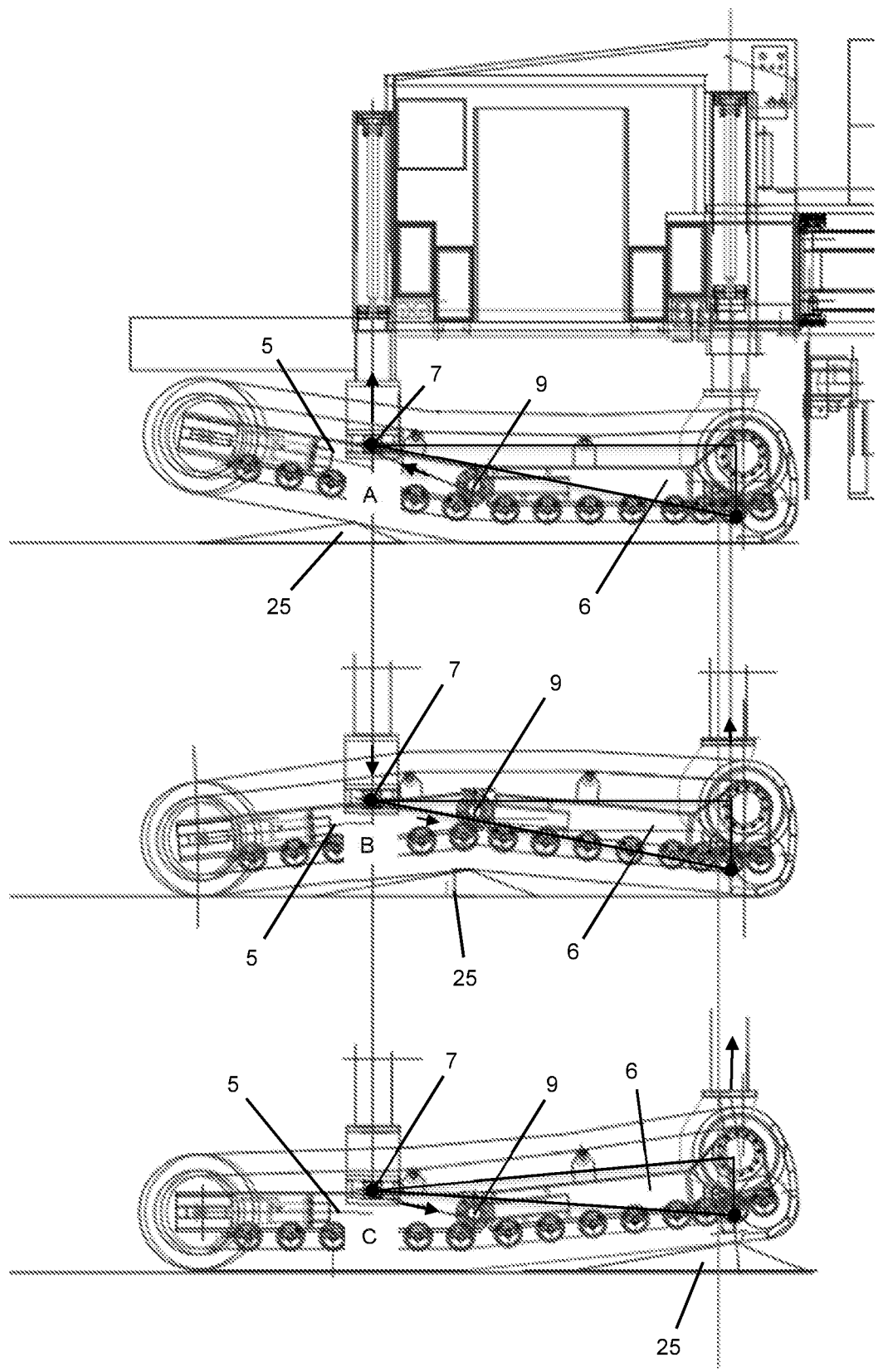
Figure 3:
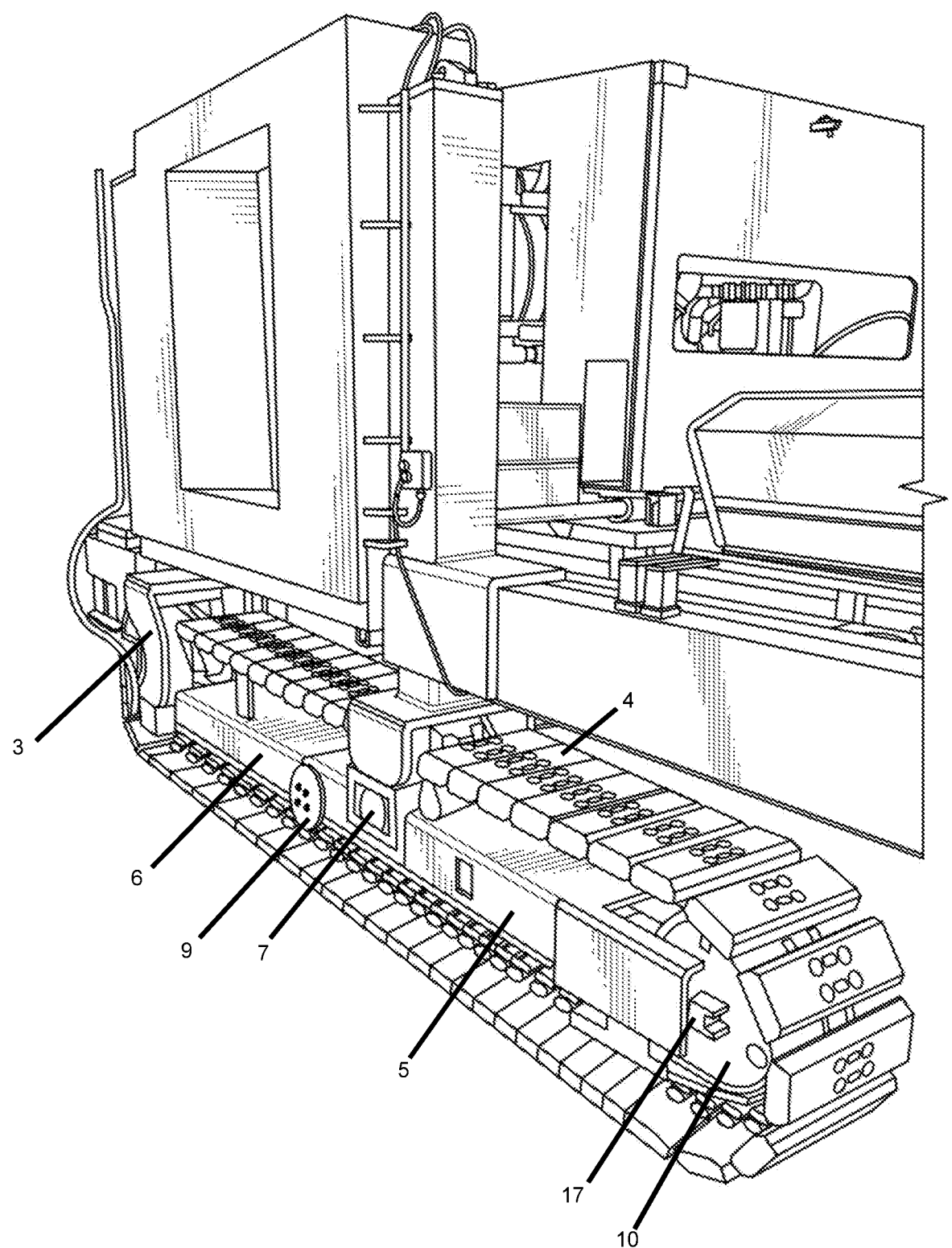

Schematic side view of a vehicle (1) according to the invention. The vehicle having a suspension frame (2), a drive frame (3) and a track chain suspension mechanism (4) characterized in that the track chain suspension mechanism has a first (5) and a second (6) track frame, the first frame being suspended to the vehicle by means of a suspension shaft (7) pivotally and slidable mounted to the suspension frame, the second track frame pivotally connected to the vehicle by means of a drive shaft (8) mounted to the drive frame and wherein said first and second track frame are pivotally connected to one another by means of a pivot shaft (9). In the shown embodiment this pivot shaft has a shaft bearing (9) and a support arm (21). In the shown embodiment the vehicle has one idler (10) at the front of the first track frame. The idler at the front of the first track frame has a recoil mechanism (13) to keep the track chain (14) under tension. In the shown embodiment this recoil mechanism (13) comprises a hydropneumatic cylinder (15) and a spring (16), to accommodate the longitudinal displacement of the idler, it is rotatable mounted on bearings (17) that slidable fit in the track frame. Another characterizing feature of the shown embodiment is that the drive shaft (8) is mounted below the rotation axis (22) of the idlers (10) when the track chain suspension mechanism is in level position. Also characterizing is the presence of an opening (18) in the suspension frame (2). This opening allows a longitudinal displacement of the suspension shaft (7). In the shown embodiment this opening is a rectangular opening and the suspension shaft comprises sliding elements at said location to allow a slidable fit of suspension shaft in said opening, in particular consisting of bronze wear plates. In the shown embodiment the first frame is about halfway suspended to the vehicle, the second track frame is connected near its rear end to the drive frame, the first and the second track frame have approximately the same length, and the drive sprocket is present at the rear end of the second track frame.

FIG. 2:

Schematic representation of the movement of the track suspension mechanisms as herein described, over an obstacle. From top to bottom shows movement of the obstacle (25) from the front to the back of the track suspension mechanism.

In position A, the obstacle is present under the first track frame (5) and before the suspension shaft (7). Pivot shaft (9) and suspension shaft (7) allows front lifting of the first track frame. As a result the suspension shaft moves upwards, lengthening the short upright side of the overlay rectangular triangle between the suspension shaft, the lower track roller and the drive sprocket. As such the hypotenuse of the rectangular triangle will lengthen as well. The arrow (A) indicates the resulting upward push acting on the suspension shaft (7). Being slibable mounted on the suspension frame (2), the suspension shaft will slide forward when compared to the level position of the first track frame.

In position B, the obstacle moved beyond the suspension shaft and before midway of the second track frame. Pivot shaft (9) and suspension shaft (7) allows back lifting of the first track frame, and front lifting of the second track frame (6). The suspension shaft slightly lowers compared to position A, and the drive shaft will start moving upwards. From its most elongated position, the short upright side of the overlay rectangular triangle will starts shortening. As a consequence also the hypotenuse of the rectangular triangle will start shortening. Arrow (B) indicates the downward pull force acting on the suspension shaft (7). Being slibable mounted on the suspension frame (2), the suspension shaft will slide backwards when compared to the level position of the first track frame.

In position C, the obstacle moved beyond midway of the second track frame. Pivot shaft (9) allows back lifting of the second track frame (6). The first track frame returned to level position. Full contraction of the drive frame to the most upward position, will bring the short upright side of the overlay rectangular triangle to its shortest length, with a corresponding shortest length for the hypotenuse with the maximally backward position for the suspension shaft. Further movement over the obstacle will again lengthen the short upright side of the overlay rectangular triangle, with elongation of the hypotenuse and forward movement of the suspension shaft.

Evident from this representation is the stability of the track suspension mechanisms when moving over an obstacle. In position A, the second track is levelled and fully supported by the underlying terrain. In position C, the first track is levelled and fully supported by the underlying terrain. In position B, both the first and second track make contact with the underlying terrain. As such, and different from a fixed track frame, there is never a balancing point where the track suspension mechanisms has a single contact point with the underlying terrain.

FIG. 3:

A perspective front side view of a vehicle according to the invention. As will be evident to the skilled artisan, the shown track suspension mechanisms is present at either side of the vehicle. The first (front) track frame (5) and the second (back) track frame (6) are connected to one another by means of a pivot shaft (9). Just in front of the pivot shaft, the first track frame is suspended to the suspension frame (4) by a suspension shaft (7). At the back end of the second track frame the track suspension mechanisms is suspended to the drive frame (3).

Figure 4:
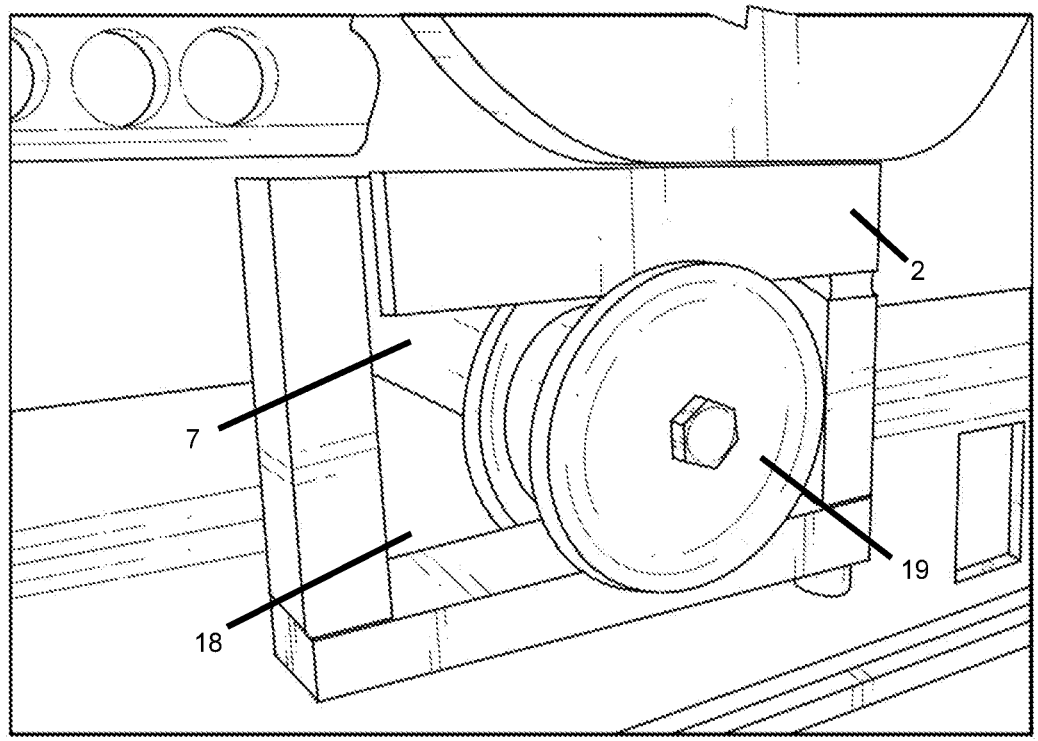
Figure 4:
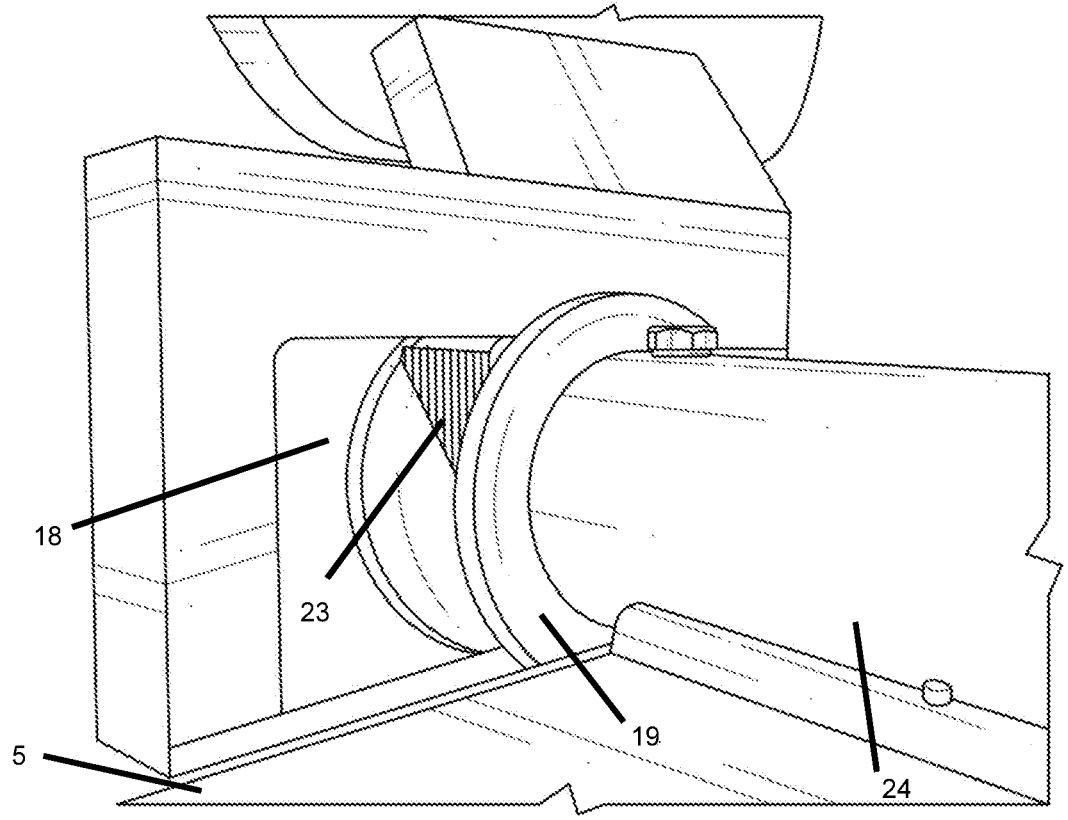
Figure 5:
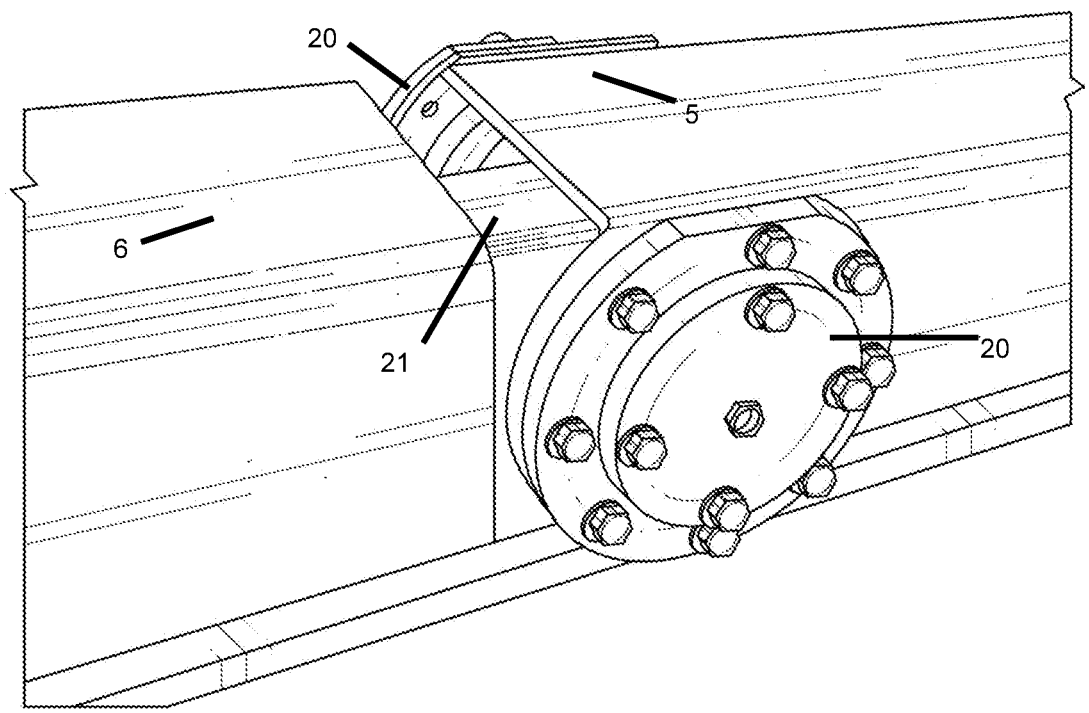

FIG. 4:

Details of the suspension frame (2) and how the suspension shaft is pivotally and slidable suspended therewith. FIG. 4A is taken from the outside and shows the flanges (19) mounted to the side of the suspension shaft and preventing a lateral displacement of the suspension shaft in the opening (18) of the suspension frame. FIG. 4B is taken from the inside and shows how the suspension shaft is pivotally suspended to the first track frame (5) by means of a cylindrical bushing (24) welded thereto. For a slidable fit the suspension shaft has bronze wear plates (23) in the opening (18) of the suspension frame (2). The flange at the outside can be removed to gain access to and allow replacement of the bronze wear plates.

FIG. 5:

Details of the pivot shaft (9), showing at either side of the first track frame (5), the shaft bearings (20). In the gap between the two track frames one can see the support arm (21) carrying the shaft and that is connected to the second track frame (6).

The invention claimed is:

1. A vehicle having a suspension frame, a drive frame and a track chain suspension mechanism wherein the track chain suspension mechanism has a first and a second track frame, the first track frame being suspended to the vehicle by a suspension shaft pivotally and slidably mounted to the suspension frame, the second track frame pivotally connected to the vehicle by a drive shaft mounted to the drive frame, and wherein the first track frame and the second track frame are pivotally connected to one another by a pivot shaft.

2. The vehicle according to claim 1, wherein the track chain suspension mechanism further comprises an idler, track rollers, a drive sprocket, and a recoil mechanism.

3. The vehicle according to claim 2, wherein the track chain suspension mechanism has only one idler at the front of the first track frame.

4. The vehicle according to claim 2, wherein the drive shaft is mounted below the rotation axis of the idlers when the track chain suspension mechanism is in a level position.

5. The vehicle according to claim 2, wherein the recoil mechanism comprises a hydropneumatic cylinder and a spring.

6. The vehicle according to claim 2, wherein the idler is rotatably mounted on bearings that slidably fit in the first and/or second track frame.

7. The vehicle according to claim 1, wherein the suspension frame comprises an opening to accommodate the suspension shaft.

8. The vehicle according to claim 7, wherein the suspension shaft has flanges.

9. The vehicle according to claim 1, wherein the pivot shaft has a shaft bearing and a support arm.

10. The vehicle according to claim 9, wherein the shaft bearing is mounted to the first track frame and the support arm is mounted to the second track frame.

11. The vehicle according to claim 1, wherein the second track frame is connected near its rear end to the drive frame.

12. The vehicle according to claim 1, wherein the first track frame and the second track frame have approximately the same length.

13. The vehicle according to claim 2, wherein the drive sprocket is present at the second track frame.

14. The vehicle according to claim 13, wherein the drive sprocket is present at the rear end of the second track frame.

15. The vehicle according to claim 7, wherein the opening is rectangular.

\* \* \* \* \*